(12) United States Patent
Fukuda (10) Patent No.: US 10,322,654 B2
(45) Date of Patent: Jun. 18, 2019

(54) VEHICLE SEAT FRAME

(71) Applicant: TOYOTA BOSHOKU KABUSHIKI KAISHA, Aichi (JP)

(72) Inventor: Tomokazu Fukuda, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 28 days.

(21) Appl. No.: 15/870,054

(22) Filed: Jan. 12, 2018

(65) Prior Publication Data

US 2018/0208093 A1 Jul. 26, 2018

(30) Foreign Application Priority Data

Jan. 24, 2017 (JP) ................... 2017-010372

(51) Int. Cl.
*B60N 2/68* (2006.01)

(52) U.S. Cl.
CPC ..................... *B60N 2/68* (2013.01)

(58) Field of Classification Search
CPC ....................................... B60N 2/68
USPC ........................ 297/452.2, 344.15
See application file for complete search history.

(56) References Cited

U.S. PATENT DOCUMENTS

| 6,095,475 | A | * | 8/2000 | Willms | ................ | B60N 2/1675 |
| | | | | | | 297/344.15 |
| 6,435,613 | B1 | * | 8/2002 | Kupietz | ................ | B60N 2/682 |
| | | | | | | 297/344.15 |
| 2015/0336477 | A1 | | 11/2015 | Matsui | | |
| 2017/0101033 | A1 | * | 4/2017 | Ferenc | ................ | B60N 2/682 |

FOREIGN PATENT DOCUMENTS

JP 2015-223851 12/2015

\* cited by examiner

*Primary Examiner* — Anthony D Barfield
(74) *Attorney, Agent, or Firm* — Greenblum & Bernstein, P.L.C.

(57) ABSTRACT

A vehicle seat frame that uses one spacer to enable maintaining of positional relationship between three components is provided. The vehicle seat frame comprises a rod; a first frame; a second frame that comprises a first open hollow for the rod to pass through and extends to cross a rod axis; a third frame that extends to cross the rod axis; and a spacer that comprises a first spacer portion that is disposed between and contactable to the first frame and the second frame, and a second spacer portion that extends from the first spacer portion, passes through a second open hollow disposed in the second frame towards a third frame, and has an extending end that is contactable to the third frame.

5 Claims, 6 Drawing Sheets

VEHICLE SEAT FRAME

CROSS-REFERENCE TO RELATED APPLICATIONS

This application claims the benefit of Japanese Patent Application No. 2017-010372 filed Jan. 24, 2017 in the Japan Patent Office, the entire disclosure of which is incorporated herein by reference.

BACKGROUND

The present disclosure relates to a vehicle seat frame that configures a framework of a vehicle seat.

For example, Japanese Unexamined Patent Application Publication 2015-223851 discloses an invention in which three links or frames (hereinafter referred to as frames) are attached to one pipe material, and a hollow cylindrical spacer is disposed between each adjoining frames.

SUMMARY

The invention disclosed in the aforementioned publication requires two spacers to maintain the positional relationship between the three frames.

To reduce the number of components, it is preferable that one aspect of the present disclosure provides a vehicle seat frame that can maintain positional relationship between three frames with one spacer.

The present disclosure is a vehicle seat frame that configures a framework of a vehicle seat. The vehicle seat frame comprises a rod; a first frame that is disposed in a first axial end of the rod and extends to cross a rod axis; a second frame that is disposed closer to a second axial end of the rod than the first frame is, comprises a first open hollow for the rod to pass through, and extends to cross the rod axis; a third frame that is disposed closer to the second axial end of the rod than the second frame is and extends to cross the rod axis; and a spacer that comprises a first spacer portion that is disposed between and contactable to the first frame and the second frame, and at least one second spacer portion that extends from the first spacer portion towards the third frame, passes through a second open hollow disposed in the second frame, and has an extending end that is contactable to the third frame.

This configuration allows positional relationship between the first frame and the second frame to be maintained by the first spacer portion, and positional relationship between the second frame and the third frame to be maintained by the at least one second spacer portion.

Accordingly, the positional relationship between three frames can be maintained by one spacer; the number of components can therefore be reduced.

For example, if the first axial end of the rod is situated in the left side of the seat along a seat-width axis, the second axial end of the rod is situated in the right side of the seat along the seat-width axis. In this case, the first frame, the second frame, and the third frame are configured to be arranged in this order from left to right along the rod axis.

Similarly, if the first axial end of the rod is situated in the right side of the seat along the seat-width axis, the second axial end of the rod is situated in the left side of the seat along the seat-width axis. In this case, the first frame, the second frame, and the third frame are configured to be arranged in this order from right to left along the rod axis.

Similarly, if the first axial end of the rod is situated in the front side of the seat, the second axial end of the rod is situated in the rear side of the seat. In this case, the first frame, the second frame, and the third frame are configured to be arranged in this order from front to rear along the rod axis.

The present disclosure may further be configured as described below.

The first open hollow may comprise a through hole that surrounds an outer circumference of the rod. The second open hollow may comprise a recess that is sunken radially outwardly from a periphery of the first open hollow.

A first distance, which is a distance between the first frame and the second frame, may be greater than a second distance, which is a distance between the second frame and the third frame. The first spacer portion may comprise a hollow cylinder through which the rod is inserted.

In addition, the at least one second spacer portion may comprise an extended portion extending from a part of an end of the first spacer portion along the rod axis. Accordingly, the positional relationship between the three frames can be maintained at the same time as reducing the mass of the spacer.

If a first spacer portion and a second spacer portion each have a shape of a hollow cylinder, then the mass of the spacer is substantially equivalent to a combined mass of two independent spacers; the mass reduction of the spacer therefore cannot be achieved.

However, the configuration in the present disclosure enables the mass reduction of the at least one second spacer portion, and thus the mass reduction of the spacer, since the at least one second spacer portion is the extended portion extending from a part of the end of the first spacer portion.

In addition, since the first spacer portion has a shape of a hollow cylinder, contact areas of the spacer with the first frame and the second frame can be increased. Accordingly, the positional relationship between the three frames can be maintained at the same time as reducing the mass of the spacer.

At least a part of the periphery of the first open hollow may be welded to the rod. And, the first frame and the third frame may be rotatable about and relative to the rod. Since this configuration enables the positional relationship between the three frames to be maintained as described above, a space for confidently perform a welding work can be provided.

The first frame may be a side frame that is a part of a cushion frame. The second frame may be a tilt link that is a part of a tilt mechanism for tilting the front end of a seat cushion. The third frame may be a lifter link having a first end coupled to the rod and a second end coupled to a vehicle to support the cushion frame.

The rod may transmit a rotational force to the second frame. The third frame may be situated closer to the center of the seat than the second frame is along the seat-width axis. And, the first frame may be situated closer to an end of the seat than the second frame is along the seat-width axis.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

An "embodiment" explained hereinafter shows one example of embodiments that belong to the technical scope of the present disclosure. In other words, matters to specify the invention recited in the claims are not limited to specific configurations or structures that are shown in the embodiments explained hereinafter.

Arrows and other marks that indicate directions on each drawing are made for easy understanding of relationship between each drawing. Arrows and other marks (directions) labelled on each drawing do not limit the scope of the present disclosure.

At least in respect of a member or portion that is labeled with a reference numeral for explanations, there is at least one in number of such a member or portion unless the number is otherwise specified, for example, as "one of". In other words, there may be two or more of such a member or portion disposed.

First Embodiment

In the present embodiment, a front seat of a vehicle will be explained.

1. Outline of Seat Frame

Figure 1:
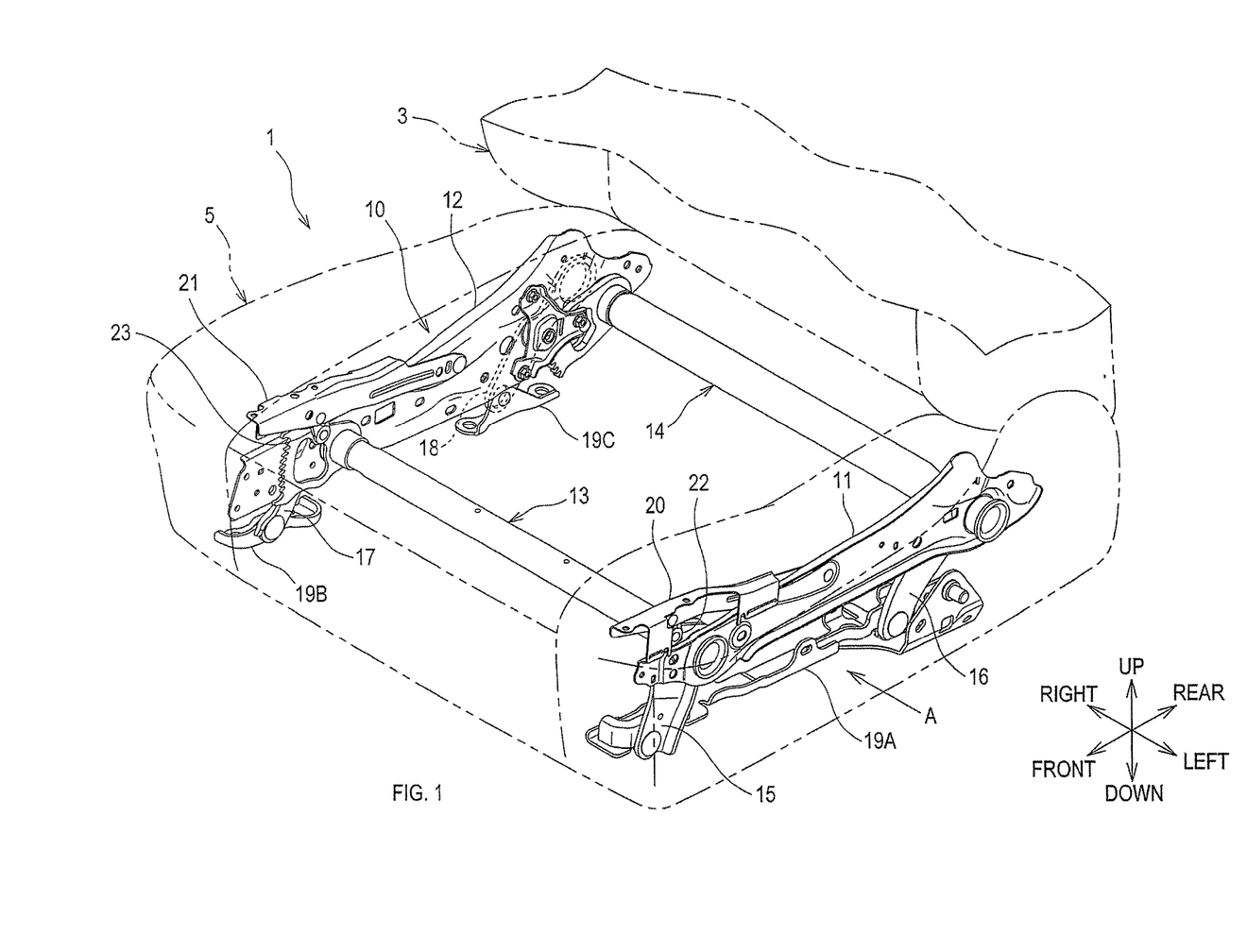
FIG. 1 is an external view of a seat frame according to an embodiment.

A vehicle seat frame (hereinafter; abbreviated to seat frame) 1 is a frame of a vehicle seat. As shown in FIG. 1, the seat frame 1 comprises a cushion frame 10 and a back frame (not shown).

The back frame is a frame of a seatback 3. The seatback 3 is a frame of the back of an occupant. The cushion frame 10 is a frame of a seat cushion 5. The seat cushion 5 is a frame of the buttocks of the occupant.

The vehicle seat according to the present embodiment comprises a tilt mechanism to change the tilt angle of the front end of the seat cushion 5, and a lift mechanism to change the height of the seat cushion 5.

2. Structure of Cushion Frame

As shown in FIG. 1, the cushion frame 10 comprises at least a left side frame 11, a right side frame 12, and two connecting rods (front connecting rod 13 and rear connecting rod 14). The left side frame 11 is disposed in the left side of the seat and extends along the front-rear axis of the seat.

The right side frame 12 is spaced apart from the left side frame 11 along the seat-width axis and is disposed in the right side of the seat. The right side frame 12 extends along the front-rear axis of the seat. The two connecting rods (front connecting rod 13 and rear connecting rod 14) extend along the seat-width axis and couple the left side frame 11 to the right side frame 12. These two connecting rods (front connecting rod 13 and rear connecting rod 14) may include hollow or solid cylindrical rod.

The front connecting rod 13 couples a front end of the left side frame 11 to a front end of the right side frame 12 as shown in FIG. 1. Similarly, the rear connecting rod 14 couples a rear end of the left side frame 11 to a rear end of the right side frame 12.

Figure 4:
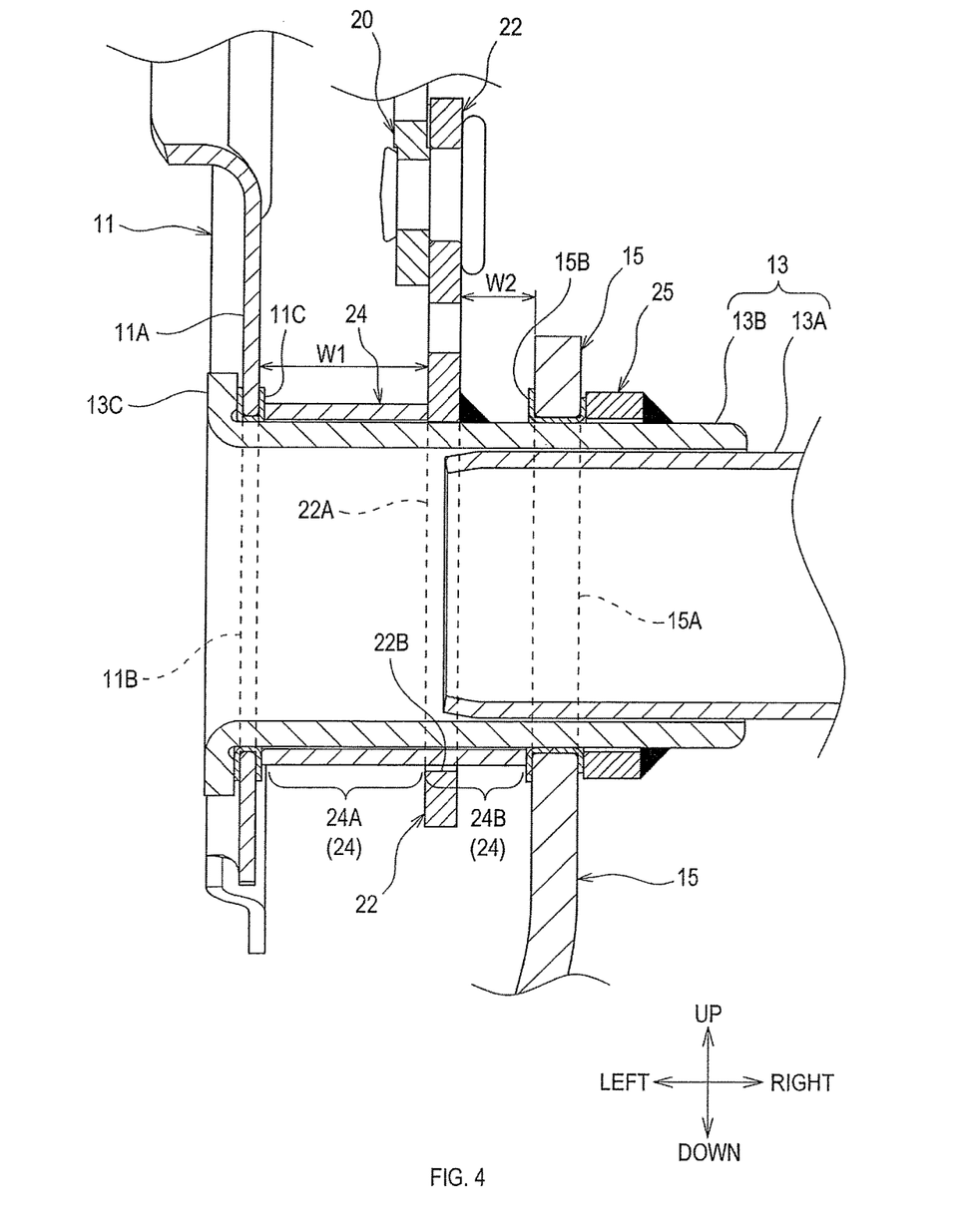
FIG. 4 is a sectional view taken along line IV-IV in FIG. 2.

As shown in FIG. 4, the front connecting rod 13 according to the present embodiment comprises, for example, a hollow cylindrical pipe 13A, and a hollow cylindrical collar 13B that is integrated with the pipe 13A. The collar 13B is integrated with the pipe 13A by welding (not shown) or press fitting.

The front connecting rod 13 is a part of the tilt mechanism and rotates by receiving a rotational force from an electric tilt motor (not shown). The rear connecting rod 14 is a part of the lift mechanism and rotates by receiving a rotational force from an electric lift motor (not shown).

As shown in FIG. 1, the left side frame 11 and the right side frame 12 are each supported on the vehicle body via components such as lifter links 15 to 18 (front left lifter link 15, rear left lifter link 16, front right lifter link 17, and rear right lifter link 18). Each of the lifter links 15 to 18 is a part of the lift mechanism.

More specifically, the lifter links 15 and 16 are disposed near the left side frame 11; their upper ends are coupled to the connecting rods 13 and 14 respectively and their lower ends are coupled to the vehicle body via components such as a left base member 19A.

Also, the lifter links 17 and 18 are disposed near the right side frame 12; their upper ends are coupled to the connecting rods 13 and 14 respectively, and their lower ends are coupled to the vehicle body via a front right base member 19B and a rear right base member 19C respectively, or by other components.

The lifter links 15 and 17 support the cushion frame 10 at the front side of the seat. The lifter links 16 and 18 support the cushion frame 10 at the rear side of the seat. The base members 19A to 19C according to the present embodiment are fixed to a floor panel or other components of the vehicle via a seat sliding device (not shown).

The left side frame 11 and the right side frame 12 respectively comprise tilt arms 20 and 21 (left tilt arm 20 and right tilt arm 21). The two tilt arms 20 and 21 respectively cooperate with tilt links 22 and 23 (left tilt link 22 and right tilt link 23) and other components to serve as a part of the tilt mechanism.

The tilt arms 20 and 21 each extend along the front-rear axis of the seat. The rear ends of the tilt arms 20 and 21 are respectively pivotably coupled to the left side frame 11 and the right side frame 12 (for example, see FIG. 2).

Figure 2:
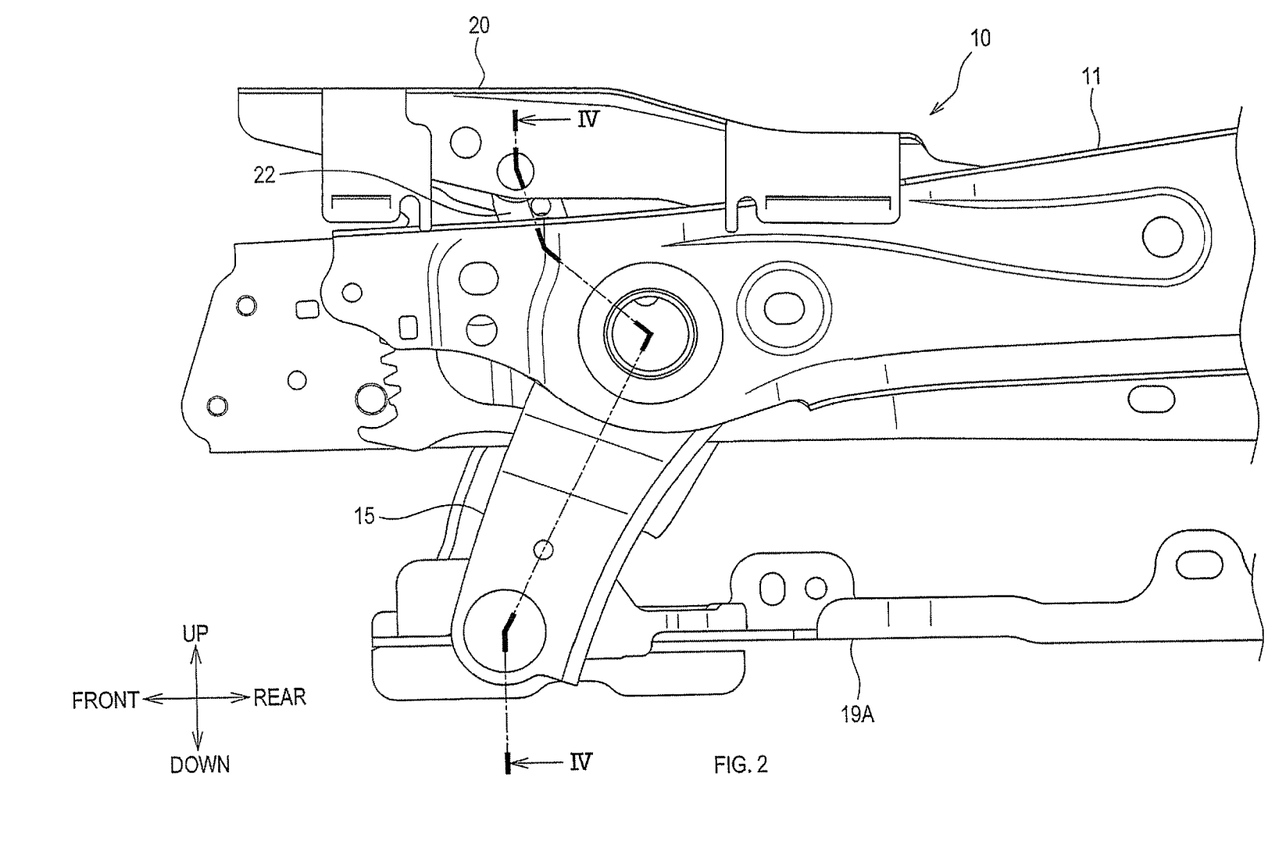
FIG. 2 is a view on arrow A of FIG. 1.
Figure 3:
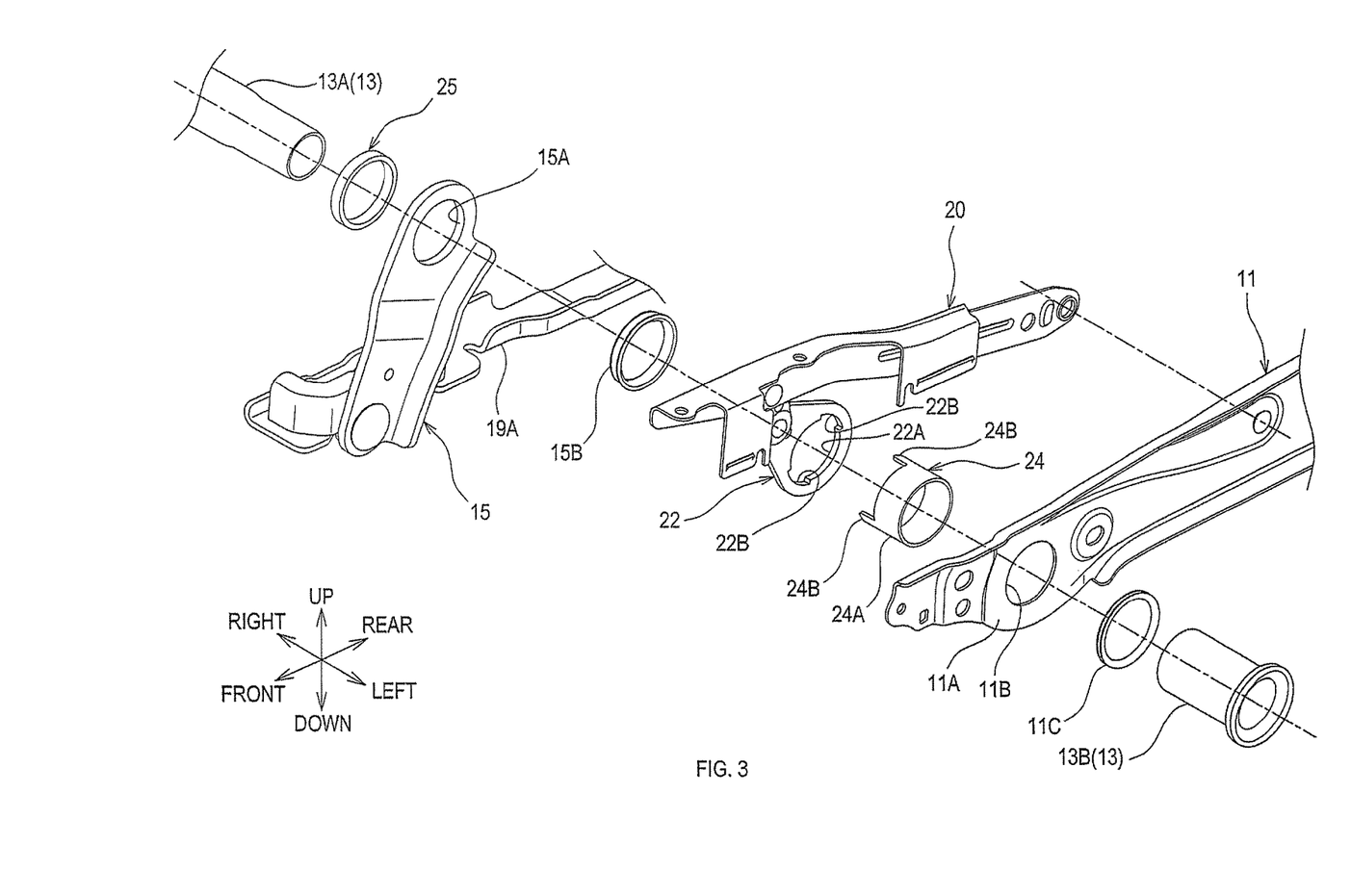
FIG. 3 is an exploded perspective view of FIG. 2.

The upper ends of the tilt links 22 and 23 are respectively pivotably coupled to the front ends of the tilt arms 20 and 21 (for example, see FIG. 2). The lower ends of the tilt links 22 and 23 are fixed to the front connecting rod 13 (for example, see FIG. 3).

Accordingly, when the front connecting rod 13 rotates, the two tilt links 22 and 23 pivot or rotate about their connections to base members 19A and 19B respectively, in conjunction with the rotation of the front connecting rod 13, which then causes the two tilt arms 20 and 21 to be pivotally and vertically displaced also in conjunction with the rotation. The front ends of the tilt arms 20 and 21 are coupled to each other with a panel-like member (not shown) that extends along the seat-width axis. The tilt angle of the seat cushion 5 at its front end is changed thereby.

In addition, the lifter links 16 and 18 pivot in conjunction with the rotation of the rear connecting rod 14 and vertically displace the entire cushion frame 10. This is in consequence of the upper ends of the lifter links 15 and 16, and 17 and 18 being pivotably coupled to the left side frame 11 and the right side frame 12 respectively; the lower ends of the lifter links 15 to 18 being pivotably coupled to their corresponding base members 19A to 19C; and the lifter link 16 and 18 being fixed to the rear connecting rod 14.

3. Assembled Structure of Front Connecting Rod 13 and Left Tilt Link 22

As shown in FIG. 4, the front connecting rod 13 is arranged such that its front rod axis substantially coincides with the seat-width axis.

The left side frame 11 comprises a panel surface 11A that extends and expands substantially perpendicularly to the rod axis of the front connecting rod 13 in a front-rear direction. A left tilt link 22 is right side frame 12 on the right side of the left side frame 11 and extends substantially perpendicularly to the front rod axis.

Figure 5:
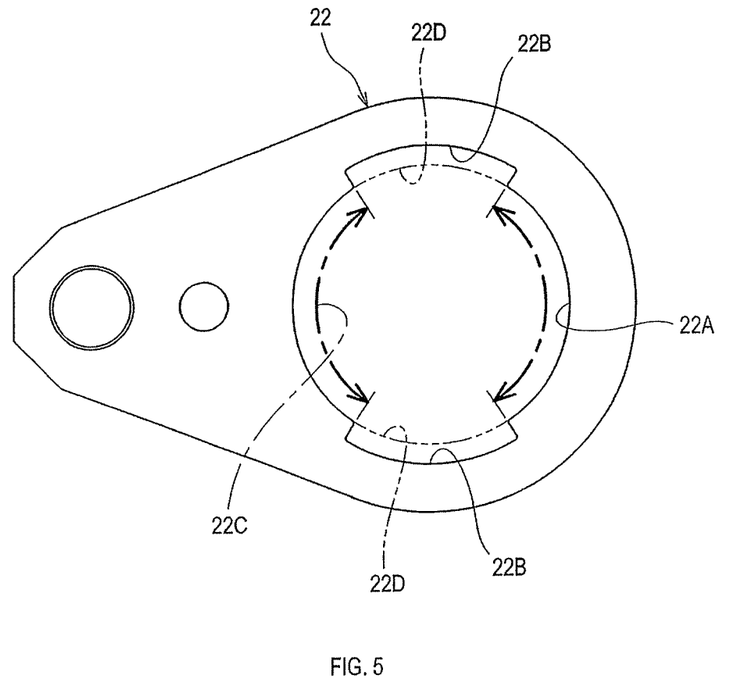
FIG. 5 is a diagram showing a tilt link according to the embodiment.

The left tilt link 22 comprises a first open hollow 22A, and a second open hollow 22B. The first open hollow 22A is where the front connecting rod 13 passes through. As shown in FIG. 5, the first open hollow 22A according to the present embodiment comprises a through hole that entirely surrounds the outer circumference of the front connecting rod 13.

As shown in FIG. 4, the second open hollow 22B is where a second spacer portion 24B passes through. As shown in FIG. 5, the second open hollow 22B according to the present embodiment comprises a recess that is sunken radially outwardly from a periphery 22D of the first open hollow 22A.

Since two or more (two, in the present embodiment) of the second spacer portion 24B according to the present embodiment are disposed (see FIG. 6), the number of the second open hollow 22B provided is accordingly the same as the number of the second spacer portion 24B.

As shown in FIG. 5, areas on the periphery of the first open hollow 22A other than those belong to the second open hollow 22B, in other words, areas on the periphery of the first open hollow 22A that directly contact the outer circumferential surface of the front connecting rod 13, are fixed portions 22C that are configured to be welded and fixed to the front connecting rod 13.

The front left lifter link 15 is disposed closer to the second end of the front connecting rod 13 along the rod axis, in other words, closer to the right side frame 12, than the left tilt link 22 is and extends substantially perpendicularly to the rod axis.

More specifically, as shown in FIG. 4, the front left lifter link 15 is situated closer to the center of the seat than the left tilt link 22 is along the seat-width axis. And, the left side frame 11 is situated closer to an end of the seat than the left tilt link 22 is along the seat-width axis.

The first distance W1, which is a distance between the left side frame 11 and the left tilt link 22, is maintained by the first spacer portion 24A. The second distance W2, which is a distance between the left tilt link 22 and the front left lifter link 15, is maintained by the second spacer portions 24B.

More specifically, the first spacer portion 24A is situated between and thereby contacts the left side frame 11 and the left tilt link 22 to maintain the first distance W1.

And, the second spacer portions 24B extend from the first spacer portion 24A towards the front left lifter link 15 and pass through the second open hollow 22B and thereby contact the front left lifter link 15 with their extending ends to maintain the second distance W2.

Figure 6:
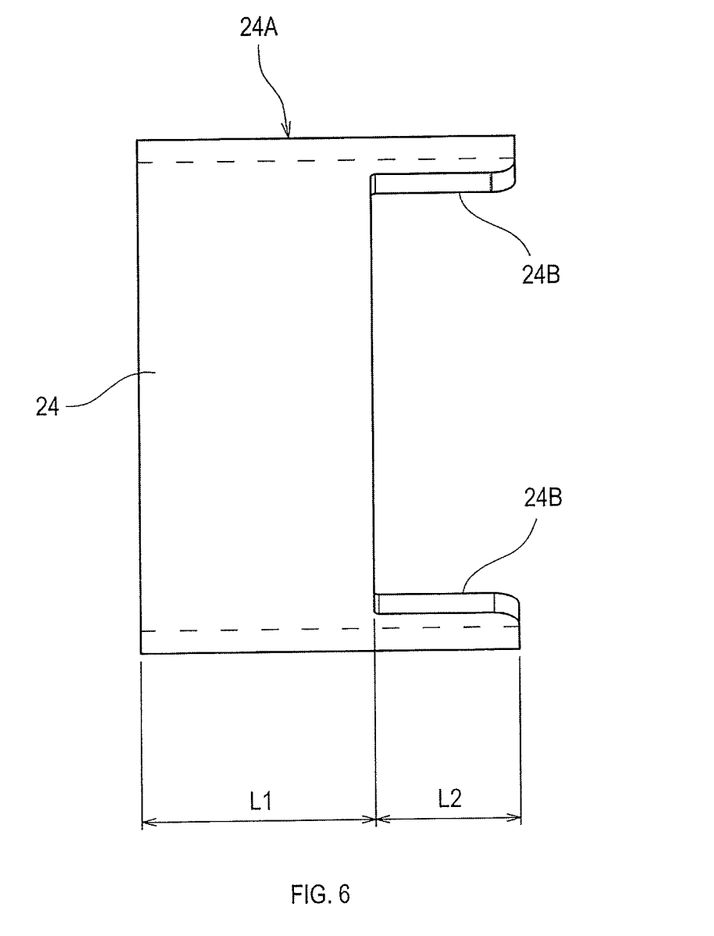
FIG. 6 is a diagram showing a spacer according to the embodiment.

As shown in FIG. 6, the first spacer portion 24A is a hollow cylindrical portion that allows the front connecting rod 13 to be inserted through. Each second spacer portion 24B comprises an extended portion extending from a part of an end of the first spacer portion 24A along the rod axis.

In other words, each of the first spacer portion 24A and the second spacer portions 24B is a part of the integrally formed metallic spacer 24. Since the first distance W1 is greater than the second distance W2, the axial length L1 of the first spacer portion 24A is greater than the axial length L2 of the second spacer portions 24B.

According to the present embodiment, the second spacer portions 24B are formed by partially cutting out a hollow pipe. The cross sections of the cut pipe, more specifically, circumferential end surfaces of the second spacer portions 24B, coincide with an imaginary surface that radially and axially extends from the center of the hollow pipe.

The left side frame 11 and the front left lifter link 15 are freely rotatable relative to the front connecting rod 13, since the left side frame 11 and the front left lifter link 15 comprise through holes 11B and 15A respectively, through which the front connecting rod 13 passes as shown in FIG. 4.

The through holes 11B and 15A (left side frame through hole 11B and front left lifter link through hole 15A) are provided with bushings 11C and 15B (left side frame bushing 11C, and front left lifter link bushing 15B) respectively on their inner circumferential surfaces; the bushings 11C and 15B are configured to come in slide contact with the outer circumferential surface of the front connecting rod 13. Each of the bushings 11C and 15B comprises a ring and two annular flanges, which are made of resin and integrated into a single piece. The ring is configured to come in slide contact with the outer circumferential surface of the front connecting rod 13. The two annular flanges are annular protrusions extending from both ends of each ring.

A spacer ring 25 is situated opposite to the second spacer portions 24B across the front left lifter link 15 and welded and fixed to the front connecting rod 13 (at the collar 13B). The front left lifter link 15 is thus interposed between the second spacer portions 24B and the spacer ring 25.

In other words, the position (in a left-right direction) of the front left lifter link 15 relative to the front connecting rod 13 is fixed by having the front left lifter link 15 interposed between the second spacer portions 24B and the spacer ring 25. And, the position (in a left-right direction) of the left side frame 11 relative to the front connecting rod 13 is fixed by having the left side frame 11 interposed between the first spacer portion 24A and a flange 13C (see FIG. 4).

The flange 13C is an annular flange that is disposed in an end of the collar 13B along the rod axis. The flange 13C is an expanding portion at the end of the collar 13B along the rod axis and formed as a single piece with the collar 13B.

The second spacer portions 24B are engaged with the second open hollows 22B. The second spacer portions 24B, in other words, the spacer 24, therefore rotates concurrently with the left tilt link 22 when the front connecting rod 13 is rotated in response to activation of the tilt mechanism.

Since the left side frame 11 and the front left lifter link 15 are not moved when the front connecting rod 13 is rotated, a direct slide-contact of the spacer 24 with the left side frame 11 and the front left lifter link 15 may cause a large rolling resistance and an attrition of the spacer 24.

In the present embodiment, however, since the annular flanges of the bushings 11C and 15B are configured to come in slide contact with the spacer 24, the large rolling resistance and the attrition of the spacer 24 are reduced.

When the front left lifter link 15 pivots in response to activation of the lift mechanism, the annular flanges of the bush 15B come in slide contact with the spacer 24 and the spacer ring 25. This reduces the large rolling resistance as well as the attrition of the spacer 24 and the spacer ring 25 in the same manner as in the case of activation of the tilt mechanism.

4. Features of Seat Frame in Present Embodiment

In the present embodiment, the first spacer portion 24A maintains the positional relationship between the left side frame 11 and the left tilt link 22, and the second spacer portions 24B maintain the positional relationship between the left tilt link 22 and the front left lifter link 15. This enables a reduction in the number of components.

One spacer 24 can therefore maintain the positional relationship between three components, 11, 15, and 22, and thus can provide a space for confidently (and directly) perform welding the left tilt link 22 to the front connecting rod 13 (see the upper left black weld in FIG. 4).

The first distance W1, which is the distance between the left side frame 11 and the left tilt link 22, is maintained by the first spacer portion 24A having a shape of a hollow cylinder. The second distance W2, which is the distance between the left tilt link 22 and the front left lifter link 15, is maintained by the second spacer portions 24B that comprise extended portions.

Accordingly, the positional relationship between the three components, 11, 15, and 22, can be maintained at the same time as reducing the mass of the spacer 24 in the present embodiment.

If the first spacer portion and the second spacer portion each have a shape of a hallow cylinder, then the mass of the spacer is substantially equivalent to a combined mass of two independent spacers.

However, the configuration in the present embodiment enables the mass reduction of the second spacer portions 24B since second spacer portion 24B is the extended portion extending from a part of the end of the first spacer portion 24A.

Meanwhile, since the first distance W1 is greater than the second distance W2, it is highly likely that a large moment is applied to the first spacer portion 24A, which serves as the root of the left side frame 11 and the left tilt link 22.

Accordingly, the larger the contact area of the spacer 24 with the left side frame 11 and the left tilt link 22 is, the more advantageous it is to confidently maintain the distance between the left side frame 11 and the left tilt link 22.

In the present embodiment, since the first spacer portion 24A has a shape of a hollow cylinder, a large contact area of the spacer 24, more specifically, the first spacer portion 24A, with the left side frame 11 and the left tilt link 22 can be provided. Accordingly, the positional relationship between the three components, 11, 15, and 22, can be maintained at the same time as reducing the mass of the spacer 24.

Other Embodiments

The first spacer portion 24A may have no contact with the left side frame 11 and the left tilt link 22 as long as the first distance W1 can be maintained in a given range of distance. Similarly, the extending ends of the second spacer portions 24B may have no contact with the front left lifter link 15 as long as the second distance W2 can be maintained in a given range of distance.

For example, the first open hollow 22A may comprise a through hole that surrounds only a part of the outer circumference of the front connecting rod 13; specifically, the left tilt link 22 may include an aperture extending from the first open hollow 22A, and penetrating through the left tilt link 22.

For example, it is only required that the seat frame 1 has at least one second spacer portion 24B.

For example, the spacer 24 may be made of resin and formed into a single piece.

The present disclosure may be utilized for structures of parts other than the assembled structure of the left side frame 11, left tilt link 22, and the front left lifter link 15 with the front connecting rod 13.

For example, the following configuration may be used: (a) a configuration in which the second spacer portions 24B are situated between the left side frame 11 and the left tilt link 22, and the first spacer portion 24A is situated between the left tilt link 22 and the front left lifter link 15; or (b) a configuration in which the first spacer portion 24A has a shape other than a hollow cylinder.

For example, the first spacer portion 24A with a hollow cylindrical shape may be shaped so that the first distance W1 is smaller than the second distance W2.

For example, at least one of the first spacer portion 24A or the front connecting rod 13 may have a shape of a hollow square rod. In addition, the front connecting rod 13 may have a shape of a solid square rod.

In the aforementioned embodiment, the second frame is fixed to the front connecting rod 13 since the left side frame 11 corresponds to the first frame, the left tilt link 22 corresponds to the second frame, and the front left lifter link 15 corresponds to the third frame. Nevertheless, the present disclosure is not limited to this configuration.

The aforementioned embodiments describe a vehicle seat for an automobile. However, utilization of the present disclosure is not limited thereto. For example, the present disclosure may be used for seats configured for other conveyances such as railway vehicles, vessels, and aircrafts.

In addition, the present disclosure is not limited to the aforementioned embodiments as long as it falls within the spirit of the invention described in the claims. Accordingly, the present disclosure may be configured in combination of at least two of the aforementioned embodiments.

What is claimed is:

1. A vehicle seat frame that configures a framework of a vehicle seat, the vehicle seat frame comprising:
   a rod;
   a first frame that is disposed in a first axial end of the rod and extends to cross a rod axis;
   a second frame that is disposed closer to a second axial end of the rod than the first frame is, comprises a first open hollow for the rod to pass through, and extends to cross the rod axis;
   a third frame that is disposed closer to the second axial end of the rod than the second frame is and extends to cross the rod axis; and
   a spacer that comprises:
      a first spacer portion that is disposed between and contactable to the first frame and the second frame; and
      at least one second spacer portion that extends from the first spacer portion towards the third frame, passes through a second open hollow disposed in the second frame, and has an extending end that is contactable to the third frame.

2. The vehicle seat frame according to claim 1, wherein
   the first open hollow comprises a through hole that surrounds an outer circumference of the rod;
   the second open hollow comprises a recess that is sunken radially outwardly from a periphery of the first open hollow;
   a first distance, which is a distance between the first frame and the second frame, is greater than a second distance, which is a distance between the second frame and the third frame;

the first spacer portion comprises a hollow cylinder though which the rod is inserted; and the at least one second spacer portion comprises an extended portion extending from a part of an end of the first spacer portion along the rod axis.

3. The vehicle seat frame according to claim 1, wherein at least a part of a periphery of the first open hollow is welded to the rod; and the first frame and the third frame are rotatable about and relative to the rod.

4. The vehicle seat frame according to claim 3, wherein the first frame is a side frame that is a part of a cushion frame;

the second frame is a tilt link that is a part of a tilt mechanism for tilting a front end of a seat cushion;

the third frame is a lifter link having a first end coupled to the rod and a second end coupled to a vehicle to support the cushion frame;

the rod transmits a rotational force to the second frame;

the third frame is situated closer to the center of a seat than the second frame is along a seat-width axis; and the first frame is situated closer to an end of the seat than the second frame is along the seat-width axis.

5. The vehicle seat frame according to claim 1, wherein the first spacer portion and the at least one second spacer portion are made of metal and integrally formed.

* * * * *